United States Patent [19]

Bauer

[11] 4,291,794
[45] Sep. 29, 1981

[54] POWER TRANSMISSION AND ENERGY ABSORBING SYSTEMS

[75] Inventor: Dieter W. Bauer, La Habra Heights, Calif.

[73] Assignee: The B. F. Goodrich Company, New York, N.Y.

[21] Appl. No.: 83,290

[22] Filed: Oct. 10, 1979

[51] Int. Cl.³ .................. F16D 13/64; F16D 13/72; B29C 25/00

[52] U.S. Cl. .................. 192/107 M; 192/113 B; 264/29.4

[58] Field of Search .............. 264/29.4; 188/71.6; 192/107 R, 107 M, 70.14, 113 B

[56] References Cited

U.S. PATENT DOCUMENTS

| | | | |
|---|---|---|---|
| 3,730,320 | 5/1971 | Freeder et al. | 192/107 M |
| 3,895,084 | 7/1975 | Bauer | 264/29.4 |
| 3,991,248 | 11/1976 | Bauer | 428/245 |
| 4,113,067 | 9/1978 | Coons et al. | 188/71.6 |
| 4,187,932 | 2/1980 | Zarembka | 192/107 M |

FOREIGN PATENT DOCUMENTS 1101471 1/1978 United Kingdom .

*Primary Examiner*—Allan D. Herrmann
*Attorney, Agent, or Firm*—James E. Brunton

[57] ABSTRACT

A power transmission-energy absorption device and carbon composite friction facing material for use therein having superior friction characteristics. Through appropriate selection of the starting carbon substrate material and through precise control over the amount and character of pyrolytic carbon, or graphite deposited interstitially of the substrate, the friction facing material can be optimized for a wide variety of applications. The material is particularly suited for use with cooling mediums, such as oil, and performs in an outstanding manner in heavy load, high temperature, hostile environments.

16 Claims, 7 Drawing Figures

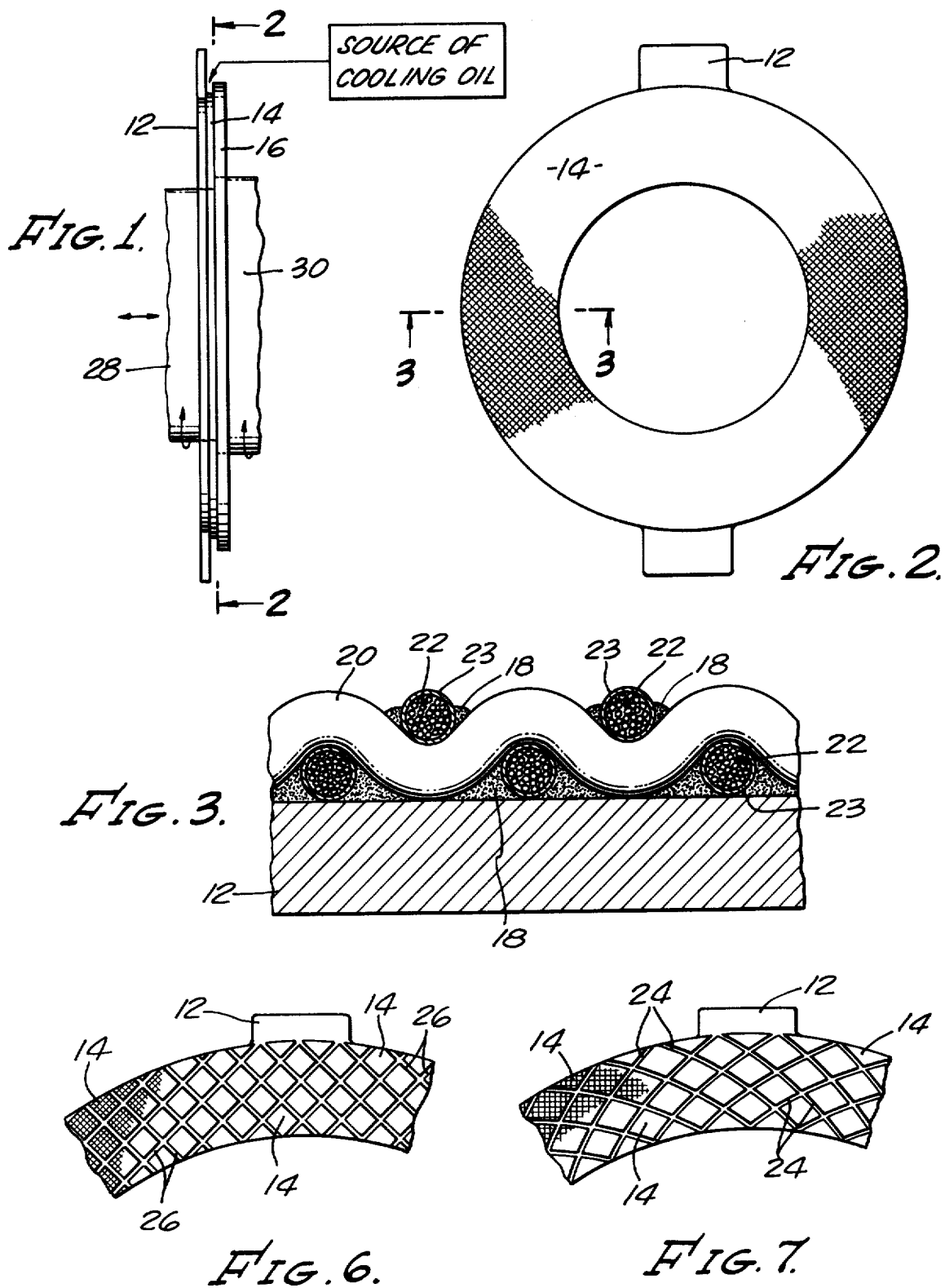

POWER TRANSMISSION AND ENERGY ABSORBING SYSTEMS

BACKGROUND OF THE INVENTION

1. Field of the Invention

This invention relates generally to friction clutch and braking devices and more particularly relates to unique devices of this type wherein specially tailored carbon and graphite composite materials are used as friction facing materials.

2. Description of the Prior Art

In clutches, brakes, automatic transmissions, limited slip differentials, hoists and similar friction power transmission and energy absorption devices, there is generally provided one or more sets of cooperating members, one of which is typically a driving or acting member and the other of which is typically a driven or acted upon member. Generally at least one of the members has a friction material surface adapted to be moved into and out of frictional engagement with an opposing surface of the cooperating member.

In liquid cooled friction power transmission-energy absorption devices, one of the cooperating surfaces is typically of solid metal and mechanical means are provided to accomplish the selective engagement and disengagement with this surface of a friction material typically provided in the form of a facing which is affixed to the second cooperating member. Typically both the acting and acted upon members move in a liquid, generally some type of cooling oil, and frequently the oil is force circulated about and between the engaging surfaces of the members so as to continuously cool them.

Heretofore, the so-called friction material or friction facing used in wet power transmission-energy absorption devices has been predominantly asbestos or composite materials containing asbestos. Under heavy load, high temperature applications these prior art friction facing materials have exhibited various deficiencies. Frequently, for example, they decompose and char due to heating even when they are arranged to run in a cooling medium. As the material degrades in use it tends to chatter, glaze and, under severe conditions, will fracture placing the entire assembly in jeopardy of serious damage.

For certain critical friction power transmission-energy absorption applications, the use of carbon and graphite materials has been suggested. For example a superior composite material for use in aircraft brakes has been developed by the present inventor. This material is described in U.S. Pat. No. 3,991,248. The herein named inventor is also aware of a proposed graphite friction facing material described in British Pat. No. 1,101,471 which issued to the Abex Corporation. This latter material, however, unlike the material described herein, in the preferred form, is constructed of a powdered carbon or graphite bonded together by a resin binder.

As will be discussed in detail in the paragraphs which follow, applicant has developed a unique friction power transmission-energy absorbtion assembly and a carbon composite friction facing material for use therein, which effectively overcomes the deficiencies of prior art systems and exhibits particularly superior characteristics in wet, or liquid cooled, applications.

In accordance with the novel method of the present invention, the carbon composite friction facing material can be specifically tailored for widely diverse applications and operating environments. Through precise control of the densification of the starting substrate, the density, porosity and friction characteristics of the friction facing materials of the invention can be optimized to accommodate numerous operating requirements.

SUMMARY OF THE INVENTION

It is an object of the present invention to provide a power transmission-energy absorption assembly embodying a carbon composite friction facing material which exhibits unique and superior friction properties, particularly when operating under oil and when operating at high temperatures under heavy load and within hostile environments.

It is another object of the invention to provide an assembly of the aforementioned character in which the friction facing material can be optimized to effectively operate against an opposing surface constructed of steel, asbestos, asbestos composites, carbon, graphite or other commonly used wet or dry friction materials.

It is another object of the invention to provide a superior carbon composite friction facing material and the method of making the same which eliminates, or substantially minimizes, friction decay, decomposition, welding, seizing and chatter even under high temperature, adverse environments.

Another object of the invention is to provide facing material as described in the preceeding paragraph which can be specifically tailored to meet special operating requirements. In this regard, through proper selection of the starting substrate material and through careful control of the character and amount of pyrolytic carbon or graphite deposited interstitially of the substrate, the degree of open porosity and accordingly the friction characteristics and the degree of oil holding capability of the material can be precisely regulated. Through subsequent heat treating the character of the material can be further tailored to meet particular end product needs.

Still another object of the invention is to provide a friction clutch or brake assembly embodying a carbon composite friction facing of the character described in which the friction facing can be machined, grooved, cut, abraded, treated or otherwise worked to optimize the circulation of cooling fluids within the assembly.

Another object of the invention is to provide a friction material as described in the previous paragraphs which is substantially fade free, dissipates heat readily, requires no prepacking or presoaking in oil and exhibits a significantly higher friction coefficient than prior art materials.

A further object of the invention is to provide a novel friction material which exhibits very low wear, which operates in a superior manner under conditions of continuously varying torque and one which will operate without chatter and noise even in light weight cooling oils.

Another object of the invention is to provide a friction material of the character described which can be inexpensively produced in very large quantities to meet a wide variety of end product requirements.

BRIEF DESCRIPTION OF THE DRAWINGS

FIG. 1 is a side elevational view of a pair of cooperating members of a friction power transmission, or energy absorption assembly, one of said members having a friction facing material affixed thereto.

FIG. 2 is a view taken along lines 2—2 of FIG. 1 illustrating the appearance of one form of the friction face of the facing material of the invention.

FIG. 3 is a greatly enlarged fragmentary cross-sectional view taken along lines 3—3 of FIG. 2.

FIG. 6 is a fragmentary plan view similar to FIG. 2 showing the appearance of the friction material after having been grooved in a rectangular pattern to control the path of flow of the cooling fluid.

FIG. 7 is a fragmentary plan view similar to FIG. 6 but showing a different type of grooving of the friction material.

DESCRIPTION OF THE PREFERRED EMBODIMENTS

Figure 4:
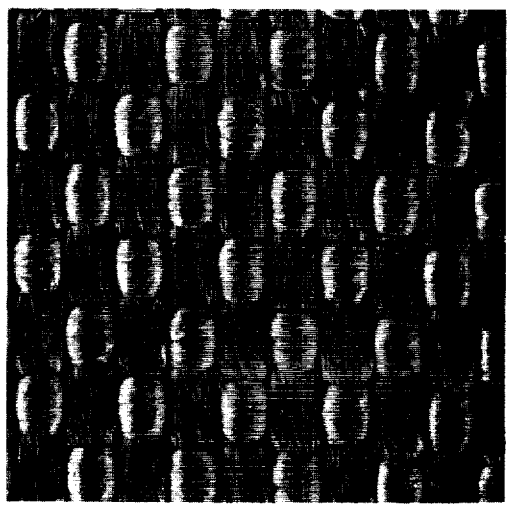
FIG. 4 is a photograph of an actual sample of the carbon composite friction material of the invention at 10 times magnification.

Before proceeding with a detailed discussion of the preferred embodiments of the present invention, the following definitions of the technical terms used herein are presented to facilitate a clear understanding of the nature and scope of the invention:

1. Carbon composite friction membrane—a thin membrane consisting of a fibrous material, the fibers of which may be carbonized or graphitized; a pyrolytic material deposited interstitially of the fibrous material; and, for certain applications, a supplementary carbonaceous binder material impregnated into the fibrous material. Additionally, this term, as used herein, denotes porous membranes formed of carbon or graphite particulates bonded together by pyrolytic carbon and, in some cases, supplementary carbonaceous binders.

2. Basic or precursor substrate—as used herein, the starting substrate or starting material before interstitial deposition of pyrolytic carbon. This starting substrate comprises a material selected from a group consisting of carbonized wool, rayon, polyacrylonitrile, pitch and porous carbon. This starting substrate may be woven, it may be nonwoven, or it may be of a porous, solid or particulate material.

3. Carbon fiber—carbon material in fibrous form.

4. Carbonaceous binder—a material supplementary to the pyrolytic material adapted to bond together the fibers of the starting substrate. Various pitch and resin materials, including thermoplastic resins, have proven satisfactory as the binder material.

5. Pyrolytic material—the material formed by pyrolysis, that is chemical decomposition by heat. Various pyrolytic materials may be used in densifying the starting substrate of the present invention including pyrolytic carbon, pyrolytic graphite, certain nitrides such as boron nitride, certain refractory metals such as tantalum, tungsten, molybdenum and columbium, as well as certain carbides including tantalum carbide, niobium carbide, zirconium carbide, hafnium carbide and silicon carbide.

6. Carbonaceous gas—a carbon containing gas.

7. Polyacrylonitrile fibers—synthetic polymeric fibers.

8. Fiber volume—volume percent of fibers present in the given substrate.

9. Non-woven—coherent fibrous material formed without uniform interlacing of threads such as batting or felt.

10. Woven—fabric formed by interlacing warp and filling threads on a loom, or the like.

11. Friction power transmission assembly—a clutch type assembly for transmitting power from a driving member to a driven member, at least one of said members having a friction facing material affixed thereto, said assembly including means for moving said members into and out of frictional driving engagement.

12. Friction energy absorbing assembly—a brake type assembly including a braking member adapted to absorb energy from a dynamic member, one of said members having a friction facing material affixed thereto, said assembly including means for moving said members into and out of frictional braking engagement.

As will be clearly illustrated by the examples which follow, the method of the invention stated in simple terms comprises the following steps: First, a suitable starting material is selected in accordance with the end use to be made of the friction material. Criteria for the selection of the starting material include, by way of example, whether the material is to be run wet or dry, whether in operation it will be required to retain the cooling medium or facilitate its circulation and whether it will be exposed to very heavy loading stresses and very high operating temperatures. The starting material most frequently used in the preferred forms of the invention is a woven carbon cloth. However, solid carbon or graphite materials and particulate carbon or graphite materials with or without binders may form the starting material.

Next the starting material is shaped by cutting or otherwise forming it into a shape at least as large as that desired of the end product. Typically, the friction material is configured into the form of a thin disc or membrane. When a carbon cloth is used as the starting material, a single thin layer of the cloth may be used to form the starting substrate. Once formed, the starting substrates are then placed into a vacuum deposition furnace for densification with a selected pyrolytic material such a pyrolytic carbon. The densification is accomplished by well known chemical vapor deposition (CVD) techniques. The various temperature and pressure ranges suitable for the CVD densification step are set forth in British Pat. No. 1,455,891. During densification, the substrates may be stacked one upon another or they may be suspended within the furnace on rods or hung from clips or the like.

The character and extent of the pyrolytic materials deposited onto the substrate depends upon the end product use which is to be made of the friction materials. By closely controlling the CVD processing paramaters, the amount of pyrolytic materials deposited onto the substrate and the degree of open porosity of the end product friction material can be precisely regulated to optimize the material for its intended use. For eample, by proper selection of the starting materials and through proper control of the densification process, the oil retaining capability of the material can be optimized. Similarly the material can be tailored for heavy or light loading and its wear characteristics can be optimized for the particular end product application. The appearance of one form of the densified substrate of the invention is illustrated in FIG. 4 of the drawings.

After densification, the material can be heat treated for certain applications or it can be used in its non-heat treated densified state. Similarly the material can be chemically treated before or after densification as may be required for particular end product uses.

Following densification and heat treating of the substrate as appropriate, the carbon composite material thus formed is bonded onto the operating surface of one or more of the cooperating members which make up the clutch or brake assembly. Such an assembly is schematically shown in FIG. 1 of the drawings. The numeral 12 designates a first member to which the carbon composite friction material 14 is affixed and the number 16 designates the second, or opposing, member which is acted upon by member 12.

In the embodiment of the invention shown in the drawings, the friction material 14 is affixed to the backing member 12 by means of a suitable high temperature adhesive. One of several types of commercially available adhesives are suitable for this purpose. The selection and use of such adhesives is well known to those skilled in the art. However, as illustrated in FIG. 3, it is important that the adhesive, indicated by the number 18, does not extend above the plane of the upper surface of the fibrous material. As indicated in FIG. 3, the adhesive 18 should uniformly cover the surface of the member 12 and shown extend about the fibers 20 and 22 securely bonding them together at their cross-over points and securely bonding the composite material to the member 12. The pyrolytic carbon coating deposited on the fibers 22 is schematically indicated by the numberal 23 in FIG. 3.

Figure 5:
FIG. 5 is a photograph of an actual sample of the carbon composite friction material of the invention at 34 times magnification illustrating the appearance of the friction surface after machining to produce a multiplicity of flat areas.

After the friction carbon composite facing is affixed to the member 12 in the manner just described, the surface thereof can be machined or ground to produce a multiplicity of flat areas of the character illustrated in FIG. 5. For certain applications this step has proven desirable for the purpose of effectively eliminating any "wear-in" of the material during initial use. In a similar fashion, the surface of the material can be abraded to roughen it, it can be lightly scored, or it can be grooved in the manner shown in FIGS. 6 and 7. By grooving the material in the manner illustrated in the drawings, the flow of the cooling fluid between the friction faces of the cooperating members of the power transmission or energy absorption assembly can be optimized for the particular application. For example, the arcuate pattern of the channels or grooves 24 shown in FIG. 7 will produce one type of fluid flow pattern while the square groove configuration 26 shown in FIG. 6 will produce another. Obviously numerous groove patterns can be cut into the material to accommodate particular end product needs.

Before proceeding with examples of the method of the invention, it is to be noted that the structure shown in FIGS. 1 through 7 of the drawings is intended to be merely exemplary of a simplified form of power transmission, or power absorption device. In actual practice such clutching or braking devices typically embody several sets of cooperating acting and acted upon members. The sets are generally interconnected with driving or driven shafts such as indicated in FIG. 1 by the numerals 28 and 30. Additionally, the shafts, or the cooperating members, are axially movable so as to enable changing the relative position between the friction facing and the opposing surface of the cooperating member from a position of complete engagement to a position of complete disengagement.

For certain applications, the opposing member 16 may be steel, asbestos, asbestos composite, or other material. In other applications said member can also carry a friction facing of like material to material 14, or of a dissimilar prior art facing material. As earlier discussed, the nature of material with which the carbon composite friction material of the invention interfaces comprises one of the criteria for determining the manner in which the substrate is infiltrated and the manner in which the composite thus formed is subsequently worked or treated.

In conventional "Wet clutch", or power transmission, applications cooling oil is forced between the cooperating surfaces of several sets of interconnected friction members. Brakes, or energy absorption devices, use a somewhat similar construction (one set, or disc or shoe being stationary, while the other set, or disc or drum is relatively rotatable). As a matter of fact, there is little difference between a clutch and a brake, and often the terms are used interchangeably. In either case, there is a friction assembly and means for selectively engaging and disengaging the friction material and the opposing surface material.

EXAMPLE NO. 1

A rayon, square weave carbon cloth manufactured by the Hitco company was selected as the starting material for this example. This cloth was of a relatively loose weave, exhibited considerable open porosity and had a thickness of about 0.018 inches. As a first step the weight per unit area of the material was determined to be approximately 280 gms/square meter. Next several annular shaped discs having a diameter of about four inches were cut from the larger sheet of material supplied by the Hitco company. The annular shaped discs were supported by graphite rods positioned within the graphite susceptor chamber of the vacuum deposition furnace. The sheets were arranged so that gaseous materials introduced into the furnace could flow freely around them to insure that the surfaces thereof would be uniformly and simultaneously exposed to the gases. The top of the furnace was closed, the chamber evacuated and the furnace brought to operating temperature. A carbonaceous gas, predominantly methane, was then introduced into the chamber at a flow rate of approximately 225 cubic feet per hour flow and was passed through and around the heated thin, porous carbon fiber membranes for a period of on the order of 130 hours. During infiltration the temperature was held at approximately 1900° F. and the pressure within the furnace chamber was maintained at about 20 torr. After the infiltration period the flow of gases was then stopped and the furnace chamber cooled to ambient temperature.

The infiltrated sheets were measured and weighed and were found to have an average thickness of on the order of 0.030 inches and a weight per unit area of on the order of 650 gms/square meter.

The infiltrated sheets were once again placed into the vacuum furnace in the manner previously described and were infiltrated a second time using methane gas at a temperature of about 1900° F. for about 180 hours.

After cooling the membranes were once again measured and weighed. The thickness of the membranes averaged about 0.033 inches and their weight per unit area averaged about 700 gms/square meter. FIG. 4 illustrates the appearance of the membranes after infiltration.

Next the infiltrated membranes were placed in a heat treating furnace and were heat treated at about 2400° C. for about 4 hours.

Following heat treating, the carbon composite membranes were brushed to remove loose carbon and were readied for bonding to a steel backing plate of the character shown in FIGS. 1 and 2 of the drawings. An adhesive manufactured by 3M was selected as the binder and a thin film of approximately 0.003 to 0.010 inches in thickness of the adhesive was placed onto the plate. One of the densified, heat treated carbon membranes was then placed onto the adhesive and the assembly was heated with controlled pressure being applied to the membrane so that the adhesive flowed uniformly onto the steel and through and about the fibers of the material in the manner illustrated in FIG. 3.

Next the assembly thus formed was placed in a surface grinder and about 0.003 to 0.007 inches of material was removed from the high spots of the composite. FIG. 5 illustrates the appearance of the composite after this step.

The friction member was then assembled into a single clutch assembly and was run under oil against an opposing member having a steel face. The frictional characteristics of the material were excellent and virtually no wear was visable after several hours of running under load. During running the material ran smoothly with no evidence of seizing or chatter.

A second densified, heat treated composite was selected and bonded to a steel backing plate in the manner previously discussed. The assembly thus formed was then assembled into a clutch assembly and was run under oil against an opposing member having an asbestos friction member attached thereto. Once again the material performed in a superior manner exhibiting no chatter, galling or seizing. Little or no wear was observed after several hours of operation.

In a similar manner third, fourth and fifth composites were selected and bonded to steel backing plates. One of the assemblies was run against an opposing member having a prior art asbestos composite friction member. Another of the assemblies was run against a prior art carbon composite friction member and the third was run against the first assembly having the material of the invention bonded thereto. In all instances the material ran smoothly and exhibited superior friction characteristics and little wear.

EXAMPLE NO. 2

A polyacrylonitrile precursor square weave cloth manufactured by Stackpole was used in this example. As a first step the cloth weight (fiber weight) was determined and a number of large sheets about twelve inches square were loosely stacked one upon another on a base plate. A flat top plate was then placed upon the stack to hold the material in place.

The assembly thus formed was next placed into the deposition furnace and a single densification step was accomplished. Furnace processing conditions were the same as those set forth in Example No. 1.

The assembly was allowed to cool and was removed from the furnace. The top plate was removed from the stack of membranes and each membrane was carefully separated from the membrane adjacent to it.

The densified membranes were found to have a thickness of about 0.030 inches and a weight per unit area of about 700 gms/square meter.

In the manner described in Example No. 1, the composite material thus formed was cut into several annular shaped discs which were bonded to flat steel plates of the character shown in FIGS. 1 and 2 of the drawings. After the adhesive bonding was completed, one of the assemblies was placed into a milling machine and crossing grooves of the character shown in FIG. 6 were cut into the carbon composite facing material.

The unit was then placed into a wet brake assembly test unit and tested under load. The flow pattern of the cooling oil through the assembly was observed and running temperature measurements were made. During operation no seizing, chatter or noise was observed. The material proved to be fade free, exhibited high horse power per square inch loading capability and showed no torque spikes. After several hours of testing the test unit was disassembled and friction material was inspected for wear.

Inspection of the friction facing material showed no evidence of charring, galling or cracking. Further the material exhibited minimal measurable wear.

A second assembly was placed into a milling machine and grooves of the character shown in FIG. 7 were cut into the carbon composite facing material. This assembly was tested in the same manner as the first and performed in a superior manner. The flow pattern of the cooling oil through the assembly was, of course, somewhat different, but the material ran smoothly, noiselessly and without incident.

A third assembly was tested in the manner of Example No. 1, that is, without grooving or surface machining. This assembly also performed in a superior manner.

EXAMPLE NO. 3

The steps of Example No. 2 were repeated using an eight harness satin fully graphitized rayon woven material manufactured by the Hitco company.

Following densification and heat treating of the material and the bonding of discs thereof to a friction plate, the material was tested in a wet clutch assembly test unit.

The weight per unit area of this material was on the average of 800 gms/square meter. The degree of open porosity was observed to be less than that exhibited by the composites of Examples 1 and 2. it is to be noted that in all cases the degree of open porosity achieved is a function of the starting material and the method of densification. Carbon composite materials produced by the method of the present invention and showing good performance characteristics exhibited open porosity ranging from about 15 percent to 85 percent.

After a number of test cycles the test unit was disassembled and the friction material was carefully inspected. While the material of this experiment showed evidence of wear, it was chatter free and performed satisfactorily for the particular application.

EXAMPLE NO. 4

Carbonized pitch filaments were mechanically "chopped" into fibers having random lengths of between ¼ and ¾ inches to achieve the desired substrate open porosity of about 65 percent. The chopped fibers were then felted by distributing them on a planar surface. The felted material thus formed was then impregnated with a small amount of resin by a spray application. To form the starting substrate, the resin bonded felted material was then cut into annular discs about four inches in diameter.

Next the annular substrates or membranes were carbonized and then were infiltrated with pyrolytic carbon in two infiltration runs in the manner of Example No. 1.

The composite material was then bonded to steel plates as before and was tested in both the clutch and brake test units and was found to perform in an acceptable manner for certain limited applications.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A friction power absorption or power transmission assembly of the type having means for changing the relative position between a friction material and an opposing surface material from a position of complete engagement to a position of complete disengagement, said assembly comprising:
  (a) a first member;
  (b) a second opposing member;
  (c) a carbon composite membrane affixed to one of said first and second members, said membrane comprising:
    (1) a carbon fibrous substrate having an open porosity; and
    (2) a coating of pyrolytic carbon extending substantially over each of said fibers of said substrate;
  (d) means for introducing a liquid cooling medium between said first and second members.

2. An assembly as defined in claim 1 in which said carbon composite membrane has been heat treated to a temperature of on the order of 2500° F.

3. An assembly as defined in claim 1 in which said carbon fibrous substrate is in the form of a multiplicity of randomly oriented carbon fibers.

4. An assembly as defined in claim 1 in which said carbon fibrous substrate is in the form of a single layer of a fabric material having a multiplicity of interwoven carbon fibers.

5. An assembly as defined in claim 4 in which said carbon fibers are woven in an open square weave configuration.

6. An assembly as defined in claim 1 in which said carbon fibrous substrate comprises a material selected from the group consisting of wool, rayon, polyacrylonitrile and pitch.

7. A wet friction clutch or brake assembly comprising:
  (a) a first member having a first surface;
  (b) a second opposing member having a second surface;
  (c) a carbon composite membrane supported by at least one of said first and second surfaces of said members said membrane comprising:
    (1) a thin carbon fibrous substrate having a predetermined degree of open porosity; and
    (2) a coating of pyrolytic carbon of predetermined thickness extending substantially over each of said fibers of said substrate;
  (d) means for exposing said membrane to a liquid medium;
  (e) means for changing the relative position between said first and second members from a first position wherein said membrane is spaced apart from said surface of said opposing member to a second position wherein said membrane is in engagement with said surface of said opposing member.

8. An assembly as defined in claim 7 in which said carbon composite membrane is bonded to one of said first and second members by a nitrile-phenolic adhesive.

9. An assembly as defined in claim 8 in which said exposed surface of said carbon composite membrane is cut in a manner to produce a multiplicity of substantially flat contiguous surfaces.

10. A friction facing material for use in power absorption-transmission assemblies of the type adapted to be operated either in air or with a liquid cooling medium having at least one set of cooperating friction members, means for moving the friction members into and out of operable engagement and means for selectively introducing a liquid cooling medium between said cooperating friction members, said facing material comprising a carbon composite membrane adapted to be affixed to at least one of said cooperating members said membrane comprising:
  (a) a thin carbon fibrous substrate having a predetermined degree of open porosity; and
  (b) a coating of pyrolytic carbon of predetermined thickness extending substantially over each of said fibers of said substrate.

11. A friction facing material as defined in claim 10 in which said carbon fibrous substrate is in the form of a multiplicity of randomly oriented carbon fibers.

12. A friction facing material as defined in claim 10 in which said carbon fibrous substrate is in the form of a single layer of a fabric material having a multiplicity of interwoven carbon fibers.

13. A friction facing material as defined in claim 12 in which said carbon fibers are woven in an open weave configuration.

14. A friction facing material as defined in claim 10 in which said carbon fibrous substrate comprises a material selected from the group consisting of wool, rayon, polyacrylonitrile and pitch.

15. A friction facing material as defined in claim 10 in which said carbon composite membrane has a weight per unit area of between approximately 650 to approximately 800 gms/square meter.

16. A friction power absorption or power transmission assembly of the type having means for changing the relative position between a friction material and an opposing surface material from a position of complete engagement to a position of complete disengagement and of the type adapted to run either in air without a liquid coolant or in the alternative in conjunction with a liquid coolant, said assembly comprising:
  (a) a first member;
  (b) a second opposing member;
  (c) a carbon composite membrane affixed to one of said first and second members, said membrane comprising:
    (1) a carbon fibrous substrate having an open porosity; and
    (2) a coating of pyrolytic carbon extending substantially over each of said fibers of said substrate;
  (d) means for selectively introducing a liquid cooling medium between said first and second members.

* * * * *